United States Patent
Plemmons et al.

(10) Patent No.: US 7,050,685 B2
(45) Date of Patent: May 23, 2006

(54) CABLE EASY ACCESS TAPE WITH PERFORATED, PEELABLE SECTIONS

(75) Inventors: Timothy Plemmons, Mooresville, NC (US); Olaf Storaasli, Hickory, NC (US)

(73) Assignee: Alcatel, Paris (FR)

( * ) Notice: Subject to any disclaimer, the term of this patent is extended or adjusted under 35 U.S.C. 154(b) by 270 days.

(21) Appl. No.: 10/260,300

(22) Filed: Oct. 1, 2002

(65) Prior Publication Data

US 2004/0062497 A1 Apr. 1, 2004

(51) Int. Cl.
*G02B 6/44* (2006.01)

(52) U.S. Cl. ................ 385/109; 385/100; 385/110; 385/113

(58) Field of Classification Search ............ 385/109
See application file for complete search history.

(56) References Cited

U.S. PATENT DOCUMENTS

| 4,707,074 A | 11/1987 | Heywood |
| 4,776,910 A | 10/1988 | Taylor et al. |
| 5,557,698 A * | 9/1996 | Gareis et al. ............ 385/101 |
| 5,611,017 A | 3/1997 | Lee et al. |
| 5,668,912 A | 9/1997 | Keller |
| 5,737,470 A | 4/1998 | Nagano et al. |
| 5,970,196 A * | 10/1999 | Greveling et al. .......... 385/114 |
| 5,987,204 A | 11/1999 | Lee et al. |
| 6,295,401 B1 | 9/2001 | Rutterman et al. |
| 6,351,589 B1 | 2/2002 | Leggett |
| 6,545,222 B1 * | 4/2003 | Yokokawa et al. ...... 174/110 R |
| 2003/0095763 A1 * | 5/2003 | Dallas et al. ............ 385/109 |
| 2003/0118295 A1 * | 6/2003 | Lail et al. ................ 385/101 |

FOREIGN PATENT DOCUMENTS

| EP | 1 085 358 A2 | 3/2001 |
| EP | 1 178 342 A2 | 2/2002 |
| JP | 9-127383 | 5/1997 |

* cited by examiner

*Primary Examiner*—John R. Lee
*Assistant Examiner*—Phillip A. Johnston
(74) *Attorney, Agent, or Firm*—Sughrue Mion, PLLC

(57) ABSTRACT

The present invention is an easy access tape with peelable sections to allow easy access to the internal components of the cable or tube. The tape of the present invention contains at least one removable, peelable section which can be easily positioned within the cable and can be removed easily. The removable section of the tape is separated from the remainder of the tape by a number of different methods, including the use of perforation and channels. Additionally, the removable section of the tape can have a different thickness than the remainder of the tape, can be made of different materials, or have different physical properties.

20 Claims, 6 Drawing Sheets

CABLE EASY ACCESS TAPE WITH PERFORATED, PEELABLE SECTIONS

BACKGROUND OF THE INVENTION

1. Field of the Invention

The present invention generally relates to the field of optical fibers, in particular the present invention is directed to access tape with peelable, removable sections to allow easy access to fibers within cables and tubes.

2. Discussion of Related Art

Optical fibers are very small diameter glass strands which are capable of transmitting an optical signal over great distances, at high speeds, and with relatively low signal loss as compared to standard wire or cable networks. The use of optical fibers in today's technology has developed into many widespread areas, such as: medicine, aviation, communications, etc. In many of these applications it is necessary to gain access to fibers in cables which are already installed, or which are in a position such that mid-span access is required.

Prior to the development of the present invention this was accomplished through the use of cable rip-cords. Cable rip-cords are generally narrow strands of material or wire placed in a cable which, when removed, allow access to fibers by tearing the cable or buffer tube when the rip-cord is pulled. However, incorporating rip-cords in a central tube design presents a number of problems.

Because most buffer tubes or cables are lightly packed and there is room for the ripcords to float in the cavity of the buffer tubes or cables, controlling the position of the rip-cords is very difficult. When the position of the rip-cord is not controlled properly, during the access of the cable, there is the potential to damage either buffer tubes or the fibers within the buffer tubes. This damage occurs from the rip-cords either strangling the buffer tubes or fibers, or by pulling the rip-cord completely through the core of the tube or cable.

In central tube designs, two ripcords are generally necessary for proper access into the cable or tube. It is desirable for these rip-cords to be placed 180 degrees from each other, however, because of the ability for the rip-cords to float within the cable or tube, the two ripcords may move or float to the same location. This can cause serious problems when attempting to gain mid-span access to these cables, by causing either strangulation or breakage of the fibers within the tube or cable.

SUMMARY OF THE INVENTION

The present invention is directed to cable easy access tape with peelable/removable sections to address the problems with rip-cords discussed above.

The present invention uses any commonly available or known tape wrapped around the cable or tube core having at least one peelable or removable section to allow easy and controlled access to the buffer tubes or fibers, without the potential for damage. The use of peelable/removable tape permits greater (and easier) positional control of the peelable/removable sections (as they will not float within the cable) thus eliminating the need of complex cable manufacturing processes and the potential for fiber or cable damage from a miss-placed rip-cord.

The tape can be of any commonly known or used material and the peelable/removable section can be created by any number of methods. In the preferred embodiment, the peelable/removable sections of the tape are created by perforations within the tape, however other methods can also be used. For example, the peelable/removable section of the present invention can also be made with grooves in the tape, and/or can be made having a different thickness then the remainder of the tape, and/or can be made with different material properties than the remainder of the tape. The number of the peelable/removable sections in the tape can also be varied as required for the specific design of the cable/tube. The peelable sections, once separated from the remainder of the tape, act as ripcords by cutting through the outer jacket or tube to allow easy access to the fibers inside.

It should also be noted that the present invention is not limited to use in the field of fiber optics, but can also be used in any application which requires access to cables, tubes, etc., such as in electrical cables, telephonic cables, etc. Additionally, although it is advantageous to the use the present invention with cables having a central tube/central cavity design, the present invention is equally advantageous when used with other cable designs, such as loose tube cable design.

BRIEF DESCRIPTION OF THE DRAWINGS

The advantages, nature and various additional features of the invention will appear more fully upon consideration of the illustrative embodiment of the invention which is schematically set forth in the drawing, in which.

DETAILED DESCRIPTION OF THE INVENTION

The present invention will be explained in further detail by making reference to the accompanying drawings, which do not limit the scope of the invention in any way.

Figure 1:
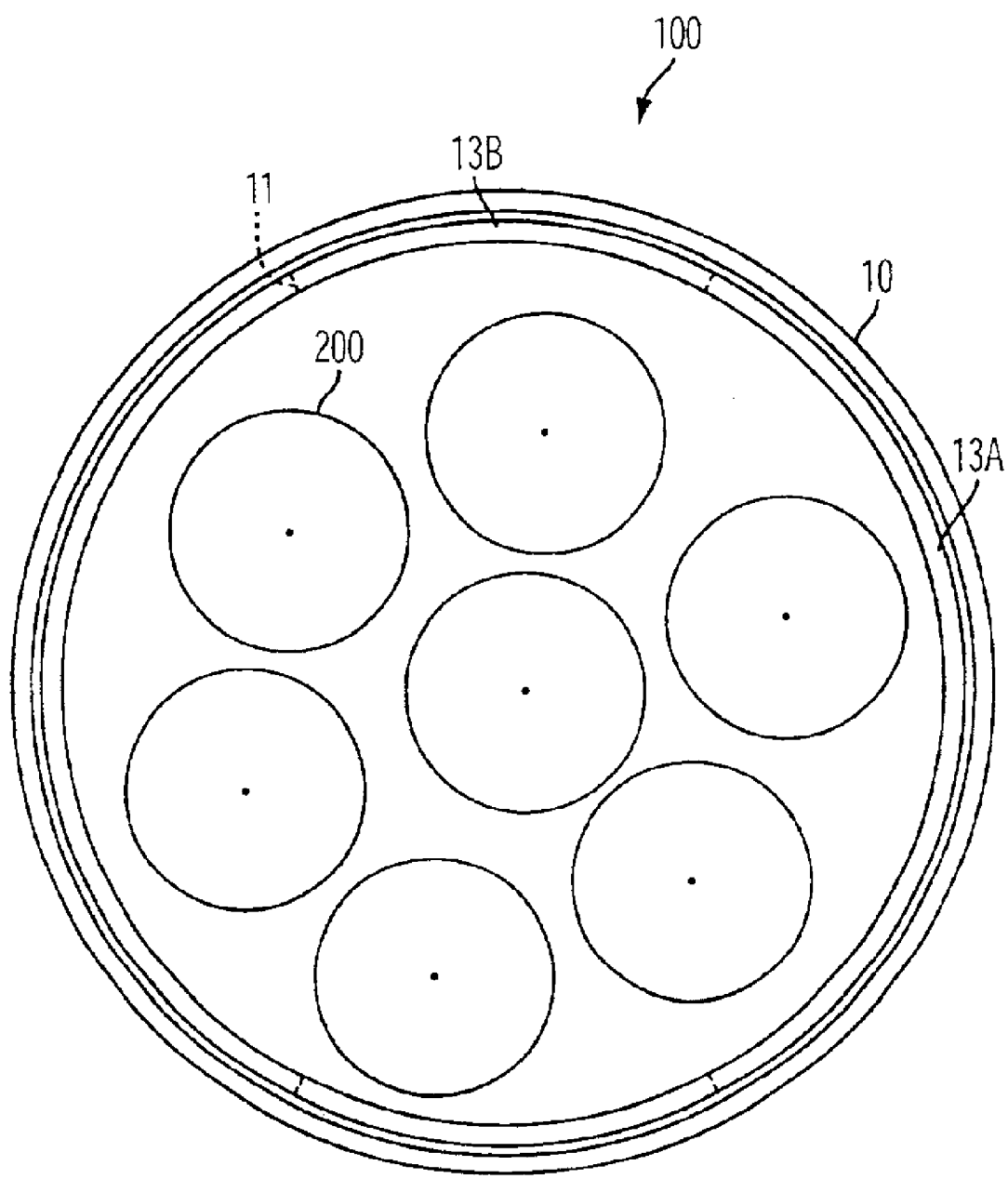
FIG. 1 is a diagrammatical representation of a cable made in accordance with the present invention.

Turning now to FIG. 1, there is depicted a cable 100 made in accordance with the present invention. As shown in FIG. 1, the cable 100 contains a number of individual buffer tubes 200, contained by a peelable tape 13A/13B, made in accordance with the present invention, and an outer jacket 10. The cable 100, buffer tubes 200 and outer jacket 10 can be made in accordance with any known or commonly used methods, materials and configurations, and the application of the present invention is not limited in this regard, in any way.

The tape 13A/13B, of the present invention, contains at least one peelable/removable section 13B and a non-peelable section 13A. It is noted that the depiction in FIG. 1 is not intended to be limiting in this regard and the sections can be reversed with respect to the item numbers. It is also noted that in FIG. 1, there are two peelable/removable sections shown at 180 degrees to each other. However, this is merely exemplary and the present invention contemplates having only one, or multiple, peelable/removable section(s) 13B, at various positions and angles with respect to each other. The tape 13A/13B shown has longitudinal running perforations 11, which run the length of the tape. These perforations 11 allow the easy peeling of the tape section 13B, without the problems associated with rip-cords. Because the tape 13A/13B essentially forms a tube within the outer jacket 10, there is no risk of the peelable sections floating to the same side of the cable 100 such that they are not separated by 180 degrees. Although shown outside buffer tube, the tape 13A/13B could also be located inside the buffer tube or at any other location within the cable.

Figure 3:
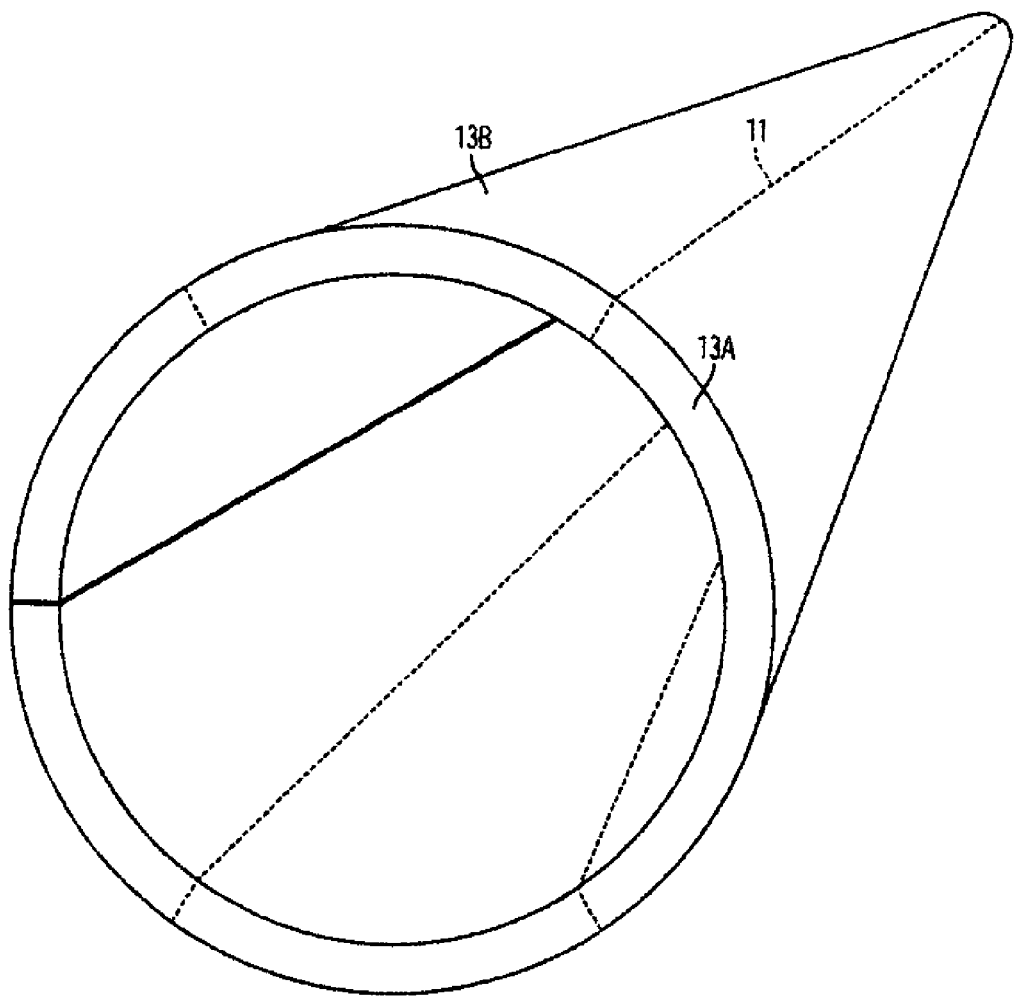
FIG. 3 is a diagrammatical representation of a tape made in accordance with the preferred embodiment of the present invention.

Although the tape 13A/13B depicted in the Figures is one made as a flat sheet and then rolled over such that the perforations run longitudinally along the cable or tube, it is also contemplated that the tape 13A/13B be made helically, with the perforations running helically along the cable or tube. It is known that in many applications tapes are applied helically in cables and tubes, thus the tape 13A/13B of the present invention can be applied in the same way. However, it should be noted that the intended use of the cable or tube should be considered when determining whether to use a helical or longitudinal application of the tape 13A/13B. A tape made in accordance with the preferred embodiment of the present invention is shown in FIG. 3, where the peelable/removable sections 13B are separated from the remainder of the tape 13A by longitudinal running perforations 11. It is noted that although the perforations 11 shown in this Figure go all the way through the tape thickness, an alternate embodiment can have the perforations only go through a portion of the tape thickness. This embodiment will provide for the peelable/removable sections 13B by providing the weak points which tear when the tape is peeled, but at the same time provides additional moisture protection as the perforations would not go all they way through the tape. Once removed, the peelable sections act as ripcords in the prior art designs, where the peelable sections are pulled through either the outer jacket or tube to allow access to the fibers or components therein.

Figure 6:
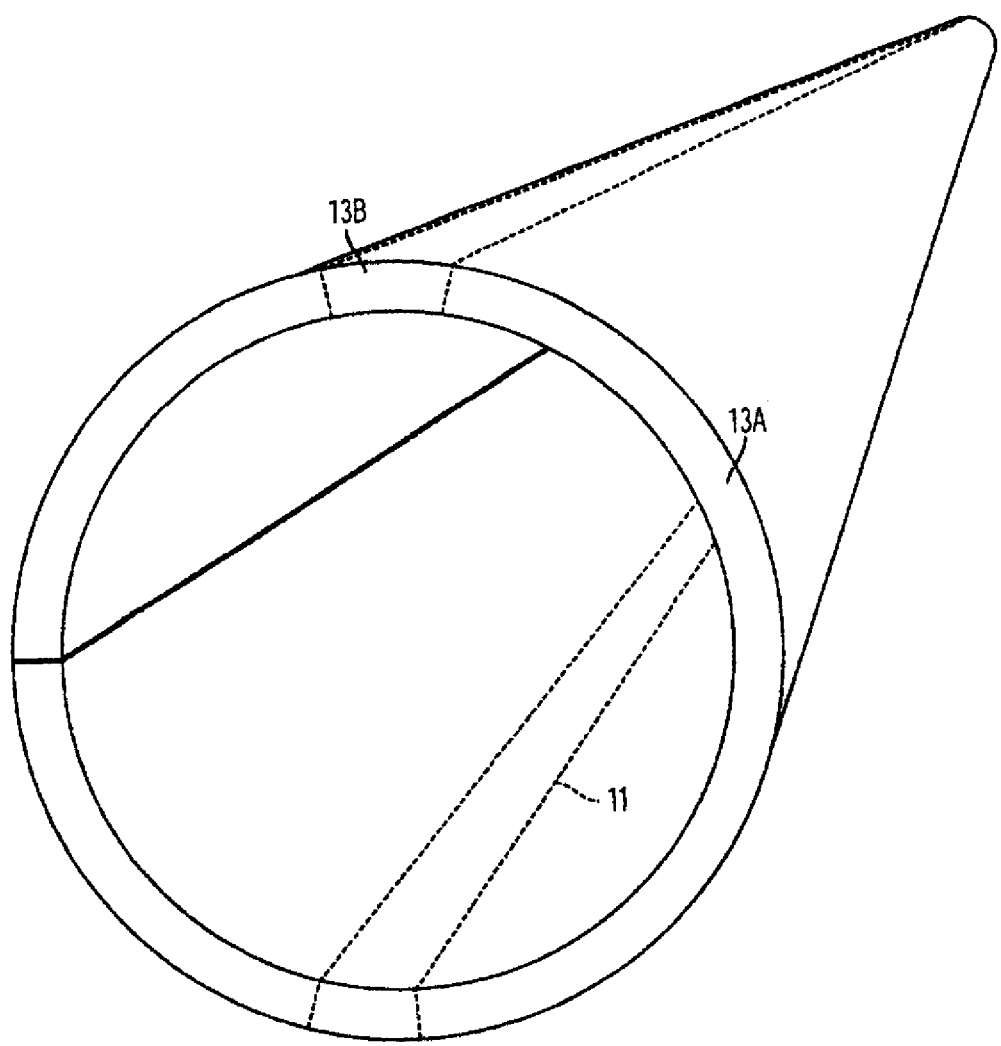
FIG. 6 is a diagrammatical representation of an alternate embodiment of the present invention depicted in FIG. 3.

The tape 13A/13B shown in FIG. 3 shows a removable section 13B which has a relatively large arc length with respect to the remainder of the tape 13A. Such a configuration allows for a considerable amount of access to the contents of the cable or tube, and should be used in applications where are large amount of access is needed. It is further contemplated that the relative arc length of the removable section 13B be small in comparison to the remainder of the tape 13A so as to allow relatively easy tearing of the cable jacket. This is shown in FIG. 6, where the arc length of the section 13B is relatively small.

Figure 4:
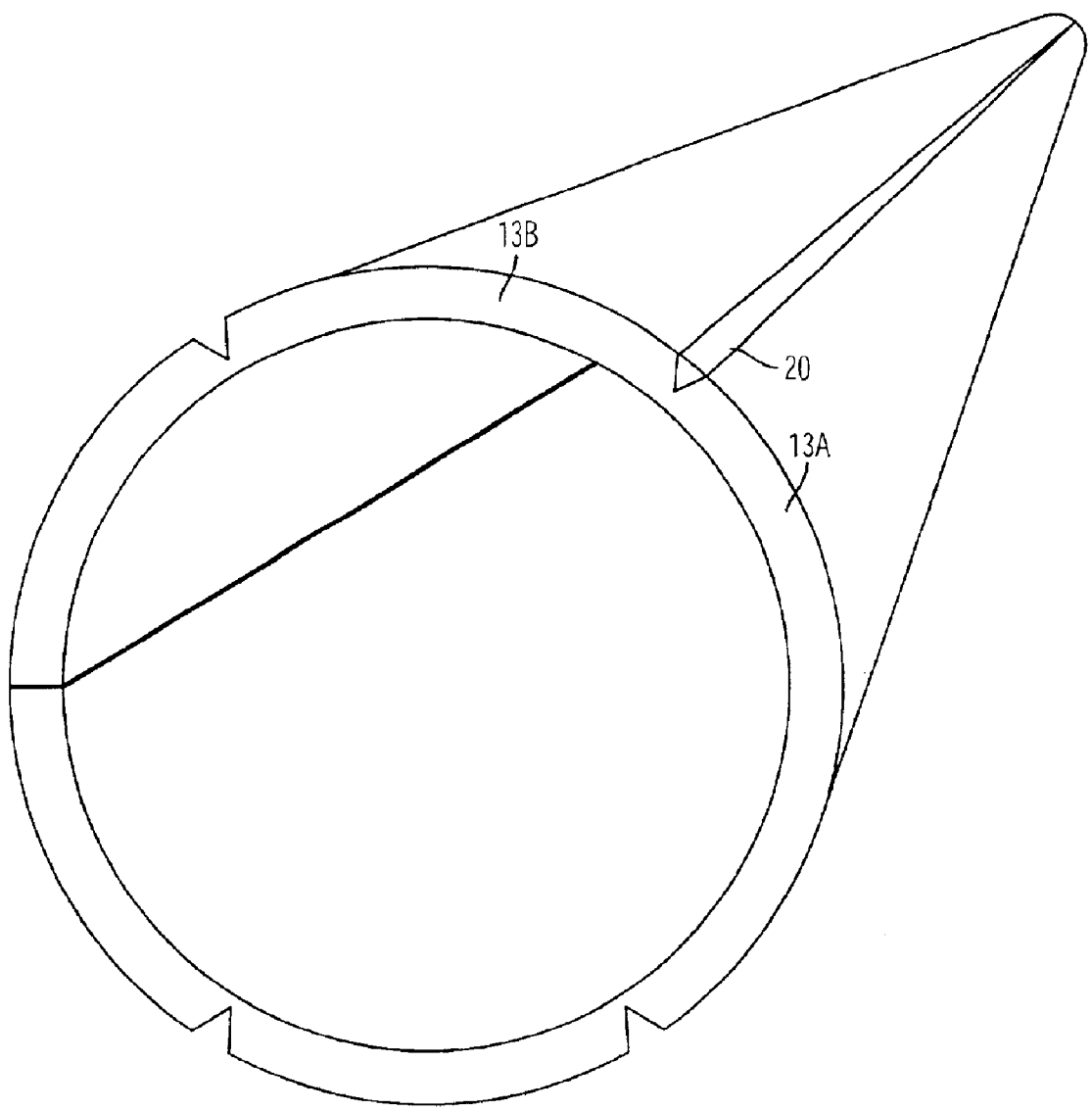
FIG. 4 is a diagrammatical representation of a tape made in accordance with an alternate embodiment of the present invention.

It is noted that even though the use of longitudinal perforations 11 is preferred, the present invention also contemplates the use of other methods to provide the peelable/removable tape section. For example, the tape can use longitudinal grooves or indentations in the tape to create channels where the tape will rip when peeled, as shown in FIG. 4. In this Figure, "V" shaped channels 20 are made in the tape 13A/13B to weaken the tape and provide the peelable/removable sections 13B.

Figure 5:
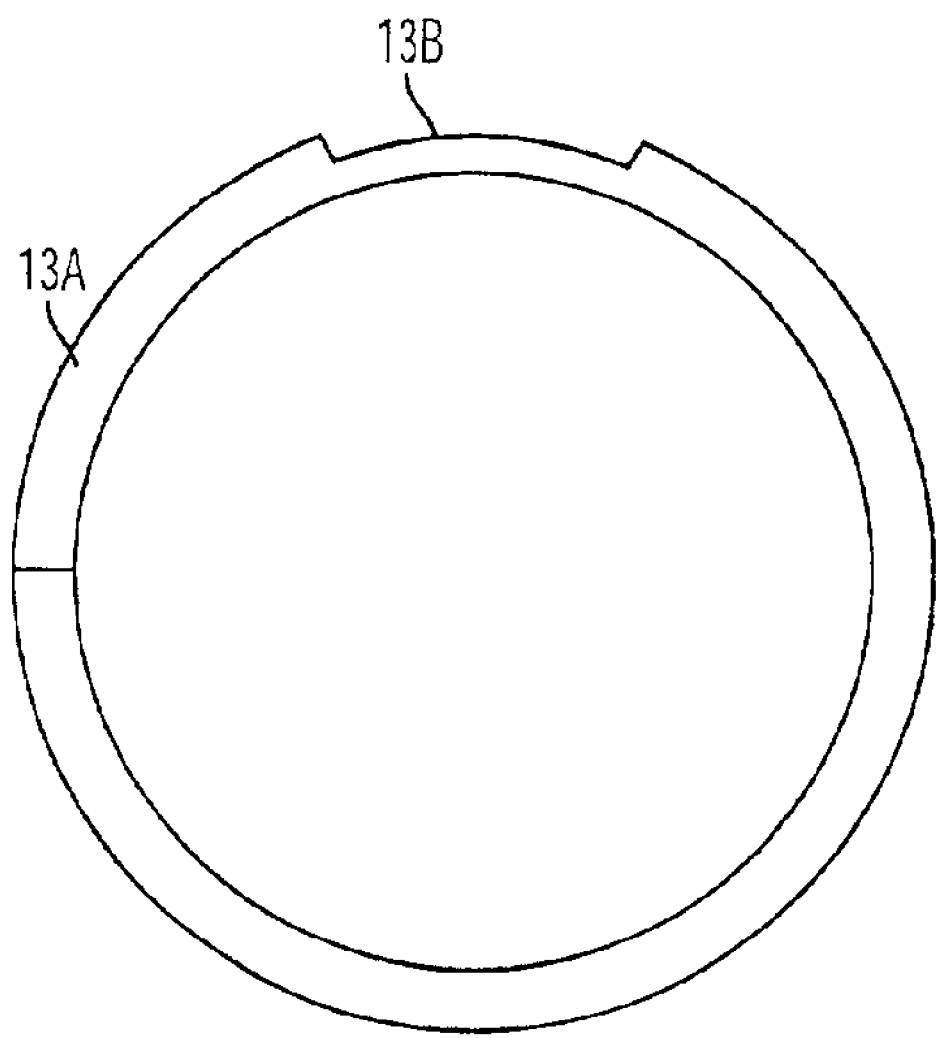
FIG. 5 is a diagrammatical representation of a tape made in accordance with an additional alternate embodiment of the present invention.

Alternatively, the peelable/removable sections 13B can be made having a different thickness then the remainder of the tape 13B, as shown in FIG. 5. This difference in thickness will allow the peelable/removable sections 13B to separate in a predetermined way from the remainder of the tape 13A, thus providing the needed access. It should be noted that although there is no preference as to whether the peelable sections should be thicker or thinner than the remainder of the tape, the peelable section should have sufficient physical characteristics such that the peelable section can be pulled through the outer jacket or tube without breaking, and in a controlled way.

Additionally, the peelable/removable section 13B can be made of different material bonded to the remainder of the tape 13A, or can be of the same material as the remainder of the tape 13A, but having different physical properties to allow for the easy peeling of the peelable/removable section 13B. In the preferred embodiment of this configuration, the peelable sections are made having stronger physical characteristics to ensure that the peelable sections break through the outer jacket or tube in a controlled manner. The stresses on the peelable sections would be greater than on the remainder of the tape, because of the pulling and, therefore, the strength of the peelable sections should be stronger. If two different materials are used they can be bonded to each other by any known or used method such as thermal bonding, chemical bonding, adhesive bonding, etc. Further, the two different materials can be made integrally with each other using known manufacturing processes, such as co-extrusion. Additionally, if the same material is used for both portions of the tape, but they have different physical properties, the two sections can also be secured to each other through the above described known methods or be made integrally with each through known methods.

It is also noted that the present invention contemplates combining any of the above alternatives. As an example, it is contemplated that the peelable/removable section of the tape 13B be separated from the remaining portion of the tape 13A by perforation 11, while at the same time having a different thickness, and or a different material or material property. The use of any one of these methods, or combination thereof, is to be optimized based on the specific design of the cable or tube and/or the desired performance requirements of the peelable tape. It is also noted that the present invention is not limited to the above referenced examples, but any commonly know or used methods of providing a peelable/removable section of the tape by weakening portions of the tape can be implemented.

It is also noted that it is not necessary that the present invention be a separate tape within the cable configuration. The peelable tape of the present invention can also serve as other needed tape layers required in cable manufacture. As an example, the tape made in accordance with the present invention can also include gel-swellable material or fire retardant material so the peelable tape can serve as a water absorbing or fire retarding layer. The advantage of this configuration is the reduction of cost in the saving of tape layers and the use of less space within the cable because a single tape layer serves multiple purposes. In this configuration, the tape 13A/13B can be made from any commonly known or used materials in cable manufacture to serve the intended purpose, which may have a base material such as polyester felt or a spun-bound material. For example, the tape 13A/13B can include commonly known or used fire retardant or water-swellable materials.

Figure 2:
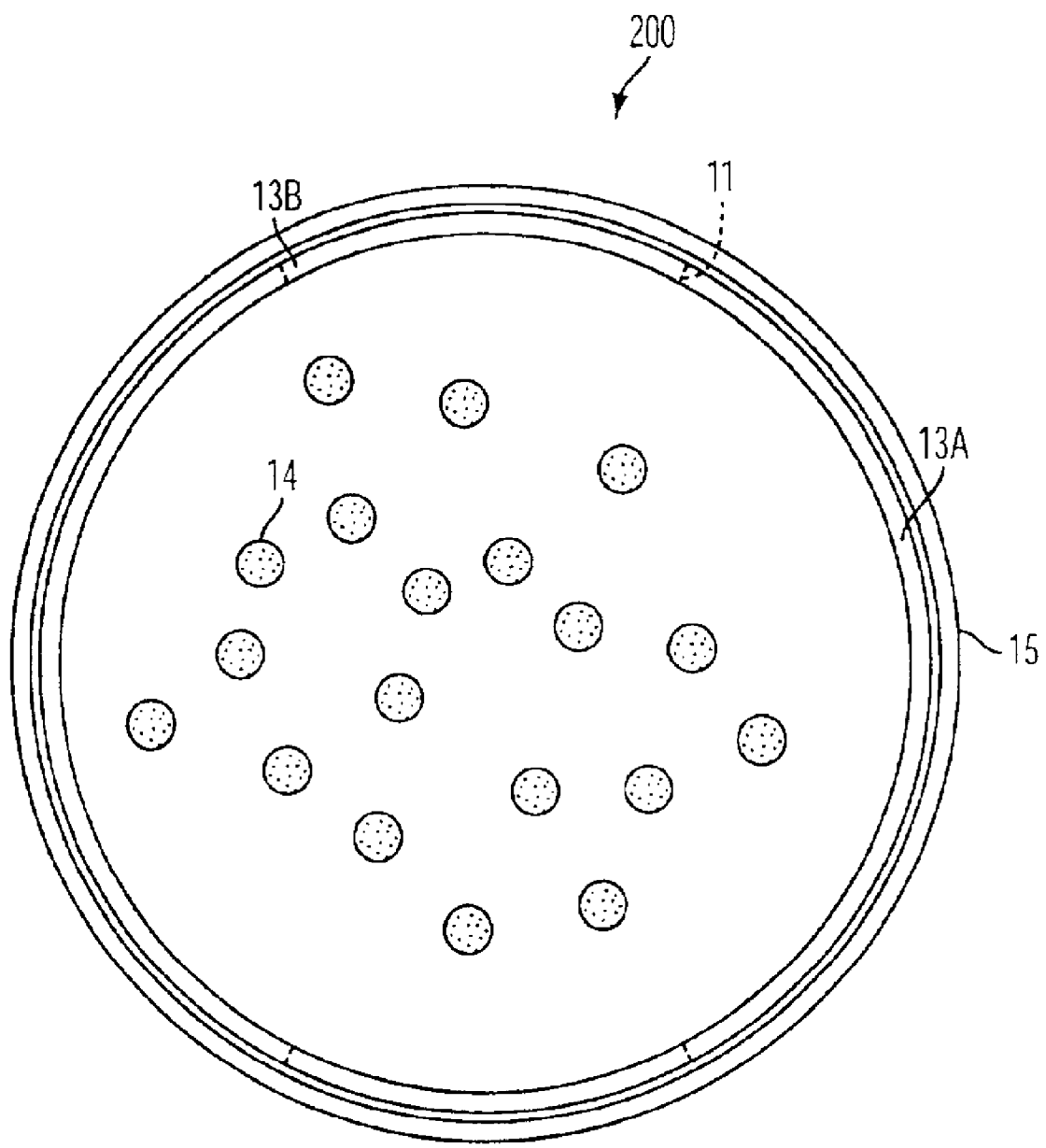
FIG. 2 is a diagrammatical representation of a buffer tube made in accordance with the present invention.

FIG. 2 shows a buffer tube 200 made in accordance with the present invention, where a plurality of fibers 14 (or any other component or conductor) is surrounded by a tape 13A/13B having longitudinal perforations 11, and a buffer tube 15. As with the cable 100 of FIG. 1, the buffer tube 200, and its components and construction can be made in accordance with any known or used method, configuration and materials, with the tape 13A/13B positioned such that the peelable/removable section 13B provides easy access to the fibers 14.

It is also noted that although the Figures of the present invention are directed to applications in the fiber optic cable industry, the present invention can also be used in other similar applications, such as electrical and telephone cables, or any other applications where it is needed to gain access to internal components of cables through an outer protective member.

It is of course understood that departures can be made from the preferred embodiments of the invention by those of ordinary skill in the art without departing from the spirit and scope of the invention that is limited only by the following claims.

We claim:

1. A cable, comprising:

an outer jacket forming a cavity;

at least one fiber disposed in said cavity; and a tape disposed between said outer jacket and said at least one fiber, wherein said tape has at least one removable section, and wherein said at least one removable section is a ripcord for said outer jacket to provide access into said cavity.

2. The cable according to claim 1, wherein said at least one removable section of said tape is defined by perforations.

3. The cable according to claim 1, wherein said at least one removable section of said tape has a different thickness than a remaining portion of said tape.

4. The cable according to claim 1, wherein said at least one removable section of said tape is made of a different material than a remaining portion of said tape.

5. The cable according to claim 1, wherein said at least one removable section has different material properties than a remaining portion of said tape.

6. The cable according to claim 1, wherein said at least one removable section is defined by two channels, wherein the depth of said channels is less than the thickness of at least one of said removable section and said remaining portion of said tape.

7. A cable, comprising:

an outer jacket forming a cavity;

at least one of a fiber, cable, and wire disposed in said cavity; and a tape disposed between said outer jacket and said at least one of a fiber, cable, and wire, wherein said tape has at least one removable section, removably connected to a remaining portion of said tape, and wherein said at least one removable section is a ripcord for said outer jacket to provide access into said cavity.

8. The cable according to claim 7, wherein said at least one removable section is defined by perforations.

9. The cable according to claim 7, wherein said at least one removable section of said tape has a different thickness than a remaining portion of said tape.

10. The cable according to claim 7, wherein said at least one removable section of said tape is made of a different material than a remaining portion of said tape.

11. The cable according to claim 7, wherein said at least one removable section has different material properties than a remaining portion of said tape.

12. The cable according to claim 7, wherein said at least one removable section is defined by two channels, wherein the depth of said channels is less than the thickness of at least one of said removable section and said remaining portion of said tape.

13. The cable according to claim 7, wherein said at least one removable section runs longitudinally along a length of said tape.

14. The cable according to claim 1, wherein said at least one removable section is secured to a remaining portion of said tape by any one of chemical bonding, thermal bonding, and adhesive bonding.

15. The cable according to claim 1, wherein said at least one removable section is made integrally with a remaining portion of said tape.

16. The cable according to claim 7, wherein said at least one removable section is made integrally with a remaining portion of said tape.

17. The cable according to claim 1, wherein said tape includes a fire-retardant material.

18. The cable according to claim 1, wherein said tape includes a gel-swellable material.

19. The cable according to claim 7, wherein said tape includes a fire-retardant material.

20. The cable according to claim 7, wherein said tape includes a gel-swellable material.

* * * * *